United States Patent
Havens et al.

(10) Patent No.: US 9,528,800 B2
(45) Date of Patent: Dec. 27, 2016

(54) DEGRADABLE SHOTGUN WAD

(71) Applicant: College of William & Mary, Williamsburg, VA (US)

(72) Inventors: Kirk J. Havens, Plainview, VA (US); Donna Marie Bilkovic, Gloucester Point, VA (US); David M. Stanhope, Hayes, VA (US); Kory T. Angstadt, Gloucester, VA (US); Wade K. Blackwood, Richmond, VA (US)

(73) Assignee: College of William and Mary, Williamsburg, VA (US)

( * ) Notice: Subject to any disclaimer, the term of this patent is extended or adjusted under 35 U.S.C. 154(b) by 33 days.

(21) Appl. No.: 14/303,496

(22) Filed: Jun. 12, 2014

(65) Prior Publication Data

US 2014/0366765 A1    Dec. 18, 2014

Related U.S. Application Data

(60) Provisional application No. 61/835,053, filed on Jun. 14, 2013.

(51) Int. Cl.
*F42B 7/08* (2006.01)
*F42B 7/02* (2006.01)

(52) U.S. Cl.
CPC .. *F42B 7/08* (2013.01); *F42B 7/02* (2013.01)

(58) Field of Classification Search
CPC ................. F42B 7/02; F42B 7/06; F42B 7/08; F42B 5/30; F42B 5/307; F42B 5/313; C80L 3/02; C80L 3/06; C08K 5/00; C08L 3/02; C08L 3/068

USPC .................. 102/532, 449–456, 461
See application file for complete search history.

(56) References Cited

U.S. PATENT DOCUMENTS

| | | | |
|---|---|---|---|
| 5,263,417 A * | 11/1993 | Godfrey-Phillips | F42B 7/08 102/453 |
| 5,859,090 A | 1/1999 | Shahid et al. | |
| 7,810,432 B2 * | 10/2010 | Stevens | F42B 7/08 102/453 |
| 2004/0099172 A1 | 5/2004 | Schikora | |

(Continued)

FOREIGN PATENT DOCUMENTS

| | | | | |
|---|---|---|---|---|
| FR | 3010410 A1 * | 3/2015 | | F42B 12/745 |
| GB | 2367606 A * | 4/2002 | | F24B 7/08 |

(Continued)

OTHER PUBLICATIONS

PCT/US14/421169, PCT Invitation to pay additional fees and, where applicable, protest fee dated Oct. 17, 2014 (2 pages).

(Continued)

*Primary Examiner* — James S Bergin
(74) *Attorney, Agent, or Firm* — Knobbe, Martens, Olson & Bear, LLP (57) ABSTRACT

Herein we describe shotgun shells each having a degradable wad comprising a polyhydroxyalkanoate polymer, as well as methods for ensuring that such wad degrades quickly after landing in an aquatic environment. Plastic, aquatic debris has a negative economic and ecological impact, and thus it is advantageous to use implements that will degrade into environmentally benign compounds. Incorporating a degradable wad into shotgun shells provides an effective, economical solution. Suitable degradable shotgun wads and methods are described herein.

20 Claims, 7 Drawing Sheets

(56) References Cited

U.S. PATENT DOCUMENTS

| | | |
|---|---|---|
| 2008/0223245 A1 | 9/2008 | Stevens et al. |
| 2012/0144722 A1 | 6/2012 | Havens et al. |
| 2016/0010963 A1* | 1/2016 | Moreno .................... F42B 7/08 |
| | | 102/532 |

FOREIGN PATENT DOCUMENTS

| | | |
|---|---|---|
| GB | 2496180 | 5/2013 |
| GB | 2496180 A | 5/2013 |

OTHER PUBLICATIONS

Search Report and Written Opinion for application No. PCT/US14/42169 dated Dec. 19, 2004.

* cited by examiner

DEGRADABLE SHOTGUN WAD

INCORPORATION BY REFERENCE TO ANY PRIORITY APPLICATIONS

The present application claims priority under 35 U.S.C. §119(e) to U.S. Provisional Patent Application No. 61/835,053, filed Jun. 14, 2013. The disclosure of this application is incorporated by reference herein. Any and all applications for which a foreign or domestic priority claim is identified in the Application Data Sheet as filed with the present application are hereby incorporated by reference under 37 CFR 1.57.

All publications, patents, and patent applications cited herein are hereby expressly incorporated by reference in their entirety and for all purposes to the same extent as if each was so individually denoted.

BACKGROUND

Field of the Invention

The field of the invention relates to degradable wads associated with shotgun shells often used in and around aquatic environments.

Description of the Related Art

Over one million waterfowl hunters are present in the United States. Sportsmen who hunt waterfowl typically use shotguns. Shotguns are one of the top produced firearms worldwide. For example, the number of new shotguns manufactured in the United States was close to one million in 2011. Moreover, the annual production of shotgun shells is in the billions. Every shotgun shell that is fired will discharge a wad at a substantial distance from the sportsman. This distance prevents recovery and the ejected wad subsequently becomes aquatic debris.

The effect of non-degradable plastic debris is significant. Abandoned shotgun wads can present safety, nuisance, and environmental problems in freshwater and estuarine waters. When a waterfowl hunter fires a shotgun, a non-degradable plastic wad common in shotgun shells is discharged into the adjoining water. The quantity of abandoned shotgun wads in the nation's waters is unknown; however, a shotgun wad is abandoned with every shot fired. Due to the range of shotguns, there is no practical way for sportsmen to recover spent shotgun wads.

Abandoned wads enter the food chain as non-degradable plastic debris. Plastic wads are reported as one of the most common debris items collected during beach cleanups (NOAA. 2012. Guidebook to community beach cleanups). The buoyancy of many plastics causes the debris to float, therefore, plastic wads that do not wash ashore will float on the water's surface. The floating wads can be mistaken for food by waterfowl and other marine species. For example, wads have been found in the stomach contents of ocean foraging birds including the albatross (The Conservation Report. 2009). The consumption of plastic leads to reduced fitness and delayed mortalities of aquatic species.

Abandoned wads also damage sensitive habitats. Over time, the non-degradable plastic wads can break apart, causing massive amounts of non-degradable microplastics to enter the aquatic ecosystem. Currents can deposit the floating wads on distant river banks and coasts, thereby impacting all marine habitats, even habitats where hunting is prohibited. Furthermore, non-degradable plastic components can remain largely intact even after spending years afloat before fracturing into smaller microplastics.

Due to the low-cost, bio-inertness, and longevity, plastic production is likely to continue to increase. Worldwide commodity plastic production has increased by 9% annually from approximately 1.5 million tons in 1950 to 245 million tons in 2008 (Chanprateep. S. 2010. Current trends in biodegradable polyhydroxyalkanoates. Journal of Bioscience and Bioengineering 110(6): 621-632). It is likely that the increase in plastic production mirrors the increase in aquatic debris. Additionally, around half the global population resides within 100 kilometers of a coastline. With coastal populations increasing, the amount of aquatic debris is likely to rise.

Degradable wads are available, for instance, some companies tout paper or cardboard wads. Many sportsmen have turned away from these shotgun shells because paper wads do not perform as well as non-degradable plastic wads. Paper wads compromise the discharge performance of shotguns, leading to less accuracy of the shot.

There remains a need for a high-performance degradable shotgun wad. A modification to shotgun wads to mitigate the impact of aquatic, plastic debris would be a viable and effective option provided: 1) the modified shotgun wad is as functional as non-degradable plastic wads to contain and propel shot; 2) the wad degrades reasonably quickly once it is abandoned in an aquatic environment, and, once degraded, is environmentally benign; and 3) the wad is relatively inexpensive in order to be of practical use. Due in part to the lack of a sufficiently viable alternative, state regulators fail to limit the enormous amount of aquatic debris created by sportsmen each year.

SUMMARY

The present disclosure modifies existing shotgun wads with a biodegradable polymer, polyhydroxyalkanoate (PHA), which does not adversely impact the accuracy of the shot based on field testing. Further, PHA breaks down quickly in an aquatic environment into benign, naturally occurring constituents. To reduce the economic burden on sportsmen, the degradable shotgun wads can be inexpensively substituted for non-degradable wads, thereby providing the desired degradability without adversely impacting the cost of shotgun shells.

Polyhydroxyalkanoate (PHA) has certain desired properties. First, the material is environmentally benign. The material degrades into benign monomers and oligomers. When the material breaks apart, each smaller piece is itself biodegradable. While many plastics have been described as being degradable, many of these plastics do not break down into benign components. Second, the material degrades in aquatic environments. Some degradable plastics decompose only in land-based environments, for example in compost heaps, but not in aquatic environments.

Further, through extensive field testing, PHA wads have certain unexpected properties. First, PHA has the unexpected advantage of degrading at a substantially faster rate when continuously submerged than when it is submerged most of the time but periodically exposed to light and air for brief periods. PHA has a specific gravity greater than 1 causing its tendency to sink in the ambient aquatic environment, which appears to accelerate the degradation of the material, perhaps by bringing the material into contact with microbes at the bottom of the aquatic environment. Second, PHA wads are as functional as non-degradable plastic wads and commercially available wads. Third, PHA is sufficiently durable to withstand being discharged from a shotgun. The PHA wads stay intact until exiting the barrel, but fragmentation occurs very soon thereafter. Fourth, the shot accuracy does not appear to be significantly influenced by petals. Therefore, the shot pattern of the PHA wads has enhanced sensitivity to adjustment with a choke, thereby providing a more universal wad for sportsmen.

In some embodiments, a shotgun shell is provided. The shotgun shell can include a shotgun case having a boundary defining an enclosed space and a degradable wad confined within the enclosed space. The degradable wad can comprise a polyhydroxyalkanoate polymer with a specific gravity greater than one. The degradable wad can degrade by weight faster when continuously submerged in an aquatic environment than at least one other degradable polymer. The other degradable polymer can be polycaprolactone. The degradable wad can have a slotted cup. The degradable wad can degrade by weight faster when continuously submerged than when sporadically submerged. The degradable wad can be negatively buoyant in the aquatic environment. The polyhydroxyalkanoate polymer can degrade into environmentally benign components.

In some embodiments, a method of shooting a shotgun shell is provided. The method can include the step of providing a shotgun case having a boundary defining an enclosed space and a degradable wad confined within the enclosed space. The degradable wad can comprise a polyhydroxyalkanoate polymer with a specific gravity greater than one. The method can include the step of loading the shotgun case into a shotgun. The method can include the step of firing the shotgun. The degradable wad can be discharged from the barrel of the shotgun. The method can include the step of exposing the degradable wad to an aquatic environment. The degradable wad can degrade by weight faster when continuously submerged in said aquatic environment than at least one other degradable polymer. The other degradable polymer can be polycaprolactone. The degradable wad can have a slotted cup. The degradable wad can degrade by weight faster when continuously submerged than when sporadically submerged. The degradable wad can be negatively buoyant in the aquatic environment. The polyhydroxyalkanoate polymer can degrade into environmentally benign components. The degradable wad can sink in the aquatic environment.

In some embodiments, a degradable wad component is provided. The degradable wad component comprises a biodegradable polymer. The degradable wad component is suitable for use in a shotgun shell. The biodegradable polymer can consist essentially of a polyhydroxyalkanoate polymer with a specific gravity greater than one. The degradable wad can degrade into benign monomers and oligomers. The degradable wad can degrade into benign monomers and oligomers in an ambient aquatic environment. The polyhydroxyalkanoate polymer can comprise hydroxybutyrate monomer. The polyhydroxyalkanoate polymer can have a molecular weight in the range of $10^4$ to $10^7$ daltons. For example, in some embodiments, the polyhydroxyalkanoate polymer has an average molecular weight of about $2 \times 10^5$ daltons. In another embodiment, the polymer has an average molecular weight of about $3 \times 10^6$ daltons. The polyhydroxyalkanoate wad can degrade several times faster when continuously submerged in an ambient aquatic environment than an otherwise identical wad made of biodegradable polycaprolactone. The specific gravity can be in the range of 1 to 1.45. In some embodiments, the specific gravity will accelerate the degradation of the material. The degradable wad can be configured to stay intact until exiting a barrel of a shotgun. The degradable wad can be configured to rapidly fragment upon exiting the barrel. The degradable wad can lack petals.

In some embodiments, a shotgun shell for use with a shotgun having a barrel is provided. The shotgun shell comprises a shotgun case having a boundary defining an enclosed space and a polyhydroxyalkanoate wad confined within said enclosed space. The wad can remain intact while traveling through the barrel. The wad can fragment upon exiting the barrel. The wad can be configured to degrade at a substantially faster rate when continuously submerged than another biodegradable plastic, e.g., polycaprolactone. The wad can comprise a slotted cup. In some embodiments, the wad does not comprise petals. The wad can degrade by weight faster when continuously submerged than when sporadically submerged. In some embodiments, the wad is negatively buoyant in an aquatic environment. The wad can have a specific gravity greater than one, which accelerates the rate of degradation in the aquatic environment. The shot pattern of the wad can be adjusted with a choke inserted into the barrel.

In some embodiments, a method of firing a shotgun shell with a shotgun having a barrel is provided. The method can comprise the step of providing a shotgun case having a boundary defining an enclosed space and a degradable wad confined within said enclosed space. The degradable wad can comprise a polyhydroxyalkanoate polymer. The method can comprise the step of loading said shotgun case into the shotgun. The method can comprise the step of firing the shotgun, whereby the degradable wad exits the barrel intact, but fragments upon exiting the barrel. In some embodiments, the degradable wad degrades by weight faster when continuously submerged than when sporadically submerged. In some embodiments, the degradable wad sinks in said aquatic environment.

In some embodiments, a method of manufacturing a shotgun wad is provided. The method can include the step of producing a degradable wad comprising a polyhydroxyalkanoate polymer. The method can include the step designing the wad to have sufficient durability to exit a shotgun barrel intact. The method can include the step designing the wad to fragment upon exiting the shotgun barrel, thereby reducing wad fragment size and enhancing the rate of degradation. The method can include the step instructing a sportsman to use a choke to adjust the shot pattern. The method can include the step of designing the wad to protect the barrel from being scratched. The method can include the step designing the wad without petals. The method can include the step testing performance to ensure the wad is as functional as other commercially available wads. The method can include the step testing performance to ensure the wad degrades in an aquatic environment.

Herein we describe a degradable shotgun wad that reduces aquatic debris by utilizing a PHA polymer. Herein we describe a method of utilizing a degradable shotgun wad to reduce aquatic debris. The method comprises the steps of providing a shotgun wad comprising a PHA polymer. After the shotgun shell is fired, the wad becomes exposed to an aquatic environment. The wad comprises PHA and degrades rapidly in aquatic environments. This allows the shotgun wad to pose substantially less risk to aquatic wildlife and the greater ecosystem.

BRIEF DESCRIPTION OF THE DRAWINGS

The summary above, and the following detailed description, will be better understood in view of the drawings which depict details of preferred embodiments.

DETAILED DESCRIPTION

The present disclosure is directed to degradable shotgun wads and methods for reducing plastic debris in aquatic ecosystems by using a wad comprising a polyhydroxyalkanoate polymer.

The term "wad" refers to a component of a shotgun shell that is used to separate the shot from the powder, and/or to provide a seal that prevents gas from blowing through the shot rather than propelling the shot out of the shotgun, and/or contain the shotgun shot. The wad design typically incorporates a container that holds the shotgun shot, and may include a shock absorber. Commercial wads often consist of three parts: the powder wad, the cushion, and the shot cup, which may be in separate pieces or can be incorporated into a single component. The wad is stored within a shotgun shell. Below the wad, the shell contains a powder charge. The primer ignites the powder charge which propels the wad through the barrel of the shotgun. The wad holds the shot together as it moves down the barrel after firing of the gun. Both the shot and the wad tend to travel significant distances and are typically abandoned by the shooter. The term "wad" includes, but is not limited to, over powder wads, over shot wads, cushion wads, and shot cups.

The wads herein described are compatible with various types of shotgun shells. It is anticipated that the wads will be incorporated into shotgun shells used for waterfowl hunting. It is envisioned that the wads describe herein can be inexpensively substituted for existing wads, thereby providing the desired degradability without adversely impacting the cost.

As used herein, a "PHA wad," "degradable wad," or "degradable shotgun wad" refers to a "wad" comprising a polyhydroxyalkanoate polymer (PHA). The degradable wad breaks down under aquatic conditions into benign monomers and oligomers. Therefore, the sportsmen that are likely to discharge degradable wads into aquatic environments can ensure that their wads do not negatively impact the environment. The degradable wads of the present disclosure degrade in coastal and ocean environments, as well as in lakes and rivers.

Polyhydroxyalkanoate polymers (PHA) represent a class of polymers. A polymer is a molecule composed of many repeated monomers. PHA polymers are true biopolymers, produced in nature by bacterial fermentation of sugar and lipids. They are linear polyesters, and more than 150 different monomers can be combined within this family to give polymers with a wide variety of properties. They can be either thermoplastic or elastomeric materials, with melting points ranging from 100° C. to 190° C., 212° F. to 374° F. The decomposition temperature is above 200° C. The chemical formula for PHA is reproduced below.

The R group can include hydrogen, methyl, ethyl, propyl, pentyl, and nonyl and the variable n can include 1, 2, and 3. Some common PHA polymers for n=1 include poly-3-hydroxypropionate, poly-3-hydroxybutyrate, polyhydroxyvalerate, poly-3-hydroxyhexanoate, poly-3-hydroxyoctanoate, poly-3-hydroxydodecanoate, n=2 include poly-4-hydroxybutyrate, n=3 include poly-5-hydroxyvalerate. Co-polymers thereof, include poly(3-hydroxybutyrate-co-4-hydroxybutyrate), also known as P(3HB-co-4HB); poly(3-hydroxybutyrate-co-valerate; also known as PHBV; poly(3-hydroxybutyrate-co-3-hydroxyhexanoate), also known as PHBH. The Nodax class of PHA polymers, originally developed at Procter and Gamble and currently sold commercially by Meredian Inc., includes PHBH and also other PHA copolymers that contain 3-hydroxybutyrate monomer units as well as other 3-hydroxyalkanoate monomer units having longer side chains. There are numerous commercial suppliers of PHA. One commercial supplier is Metabolix, who supply PHA under the trade name Mirel™. The molecular weight of PHA is in the range at $2 \times 10^5$ to $3 \times 10^6$ daltons, or approximately greater than 100,000 (by GPC).

In general, softer PHA is produced by using PHA containing a relatively low percentage of hydroxybutyrate monomer units, either 3-hydroxybutyrate or 4-hydroxybutrate. These hydroxybutyrate monomers units contain four carbons, whereas hydroxyvalerate units contain five carbons, and hydroxyhexanoate units contain six carbons. For example, in order to produce PHA wads having high softness, the constituent monomer units of the PHA should be comprised of less than 95% hydroxybutyrate monomer units, or less than 90% hydroxybutyrate monomer units. In other embodiments, it may be preferable to utilize a harder PHA wad, in which case the constituent monomer units of the PHA should be comprised of a relatively high proportion of hydroxybutyrate monomer units.

Moderating the rate of degradation of the PHA wad can be achieved, for example, by altering any of a number of factors, including but not limited to: the molecular weight of the polymer, the choice of or concentration of plasticizer of other additives, a coating on the polymer, surface imperfections, or the design of the PHA wad, in particular its thickness.

The PHA wad compositions can contain other additives, including but not limited to plasticizers, stabilizers, solvents, coloring agents, anti-oxidants, anti-fouling agents, and UV stabilizers. In preferred embodiments, any such additives are also marine-safe, and do not prevent PHA biodegradation. In some embodiments, the wad comprises PHA in a percentage by weight greater than 60%, greater than 70%, greater than 75%, greater than 80%, greater than 85%, greater than 95%, between 70% and 100%, between 80% and 90%, approximately 70%, approximately 75%, approximately 80%, approximately 85%, approximately 90%, approximately 95%, or approximately 100%. In some embodiments, the wad comprises additives in a percentage by weight between 0% and 40%, between 10% and 30%, less than 30%, less than 25%, less than 20%, less than 15%, less than 10%, less than 5%, approximately 30%, approximately 25%, approximately 20%, approximately 15%, approximately 10%, approximately 5%, or approximately 0%. In some embodiments, the wads consist essentially of PHA.

The PHA wads can be produced using any suitable production process known in the art. For example, the PHA wads can be produced by injection molding.

PHA eventually breaks down into benign monomers, oligomers, and byproducts. Other plastics, for example polyethylene (PE), do not degrade into benign monomers and oligomers in an aquatic environment. Further, many plastics referred to as degradable are not biodegradable, and may in fact be only partially degradable. Partially degradable plastics will only break apart into small pieces (e.g., microplastics), wherein the small pieces are not dissolvable by biological means, and therefore are not biodegradable. For example, the macrostructure of polypropylene (PP) formulations can break down in an aquatic environment, particularly with the use of certain additives, but the small pieces of polypropylene do not break down further, and constitute pollution. For example, these microplastics can be ingested by aquatic organisms. Once ingested, non-biodegradable plastics have the potential to accumulate in the fatty tissue of aquatic species instead of being returned to compounds found in nature. In contrast, PHA is biodegradable and can be metabolized by marine species. Many common microorganisms utilize PHA as a growth substrate.

"Spent" refers to the ejection of the wad from the shotgun. Note that a spent degradable wad does not necessarily enter and degrade in an aquatic environment, but instead could be ejected onto land. In some instances, the spent degradable wad will degrade into benign monomers and oligomers when it lands or is swept into a body of water.

There are many variables that impact when and if a shotgun wad will degrade. The time to degradation is complicated by the fact that underwater aquatic environments can have substantial variability in terms of pressure, temperature, salinity, and biodiversity, all of which can impact the rate of degradation. Further, degradation is usually not consistent throughout the component. For example, the injection molding process can have an influence. Imperfections in the degradable wads (i.e., due to poor polymer flow) can increase the likelihood of failure. Moderating the rate of degradation of a shotgun wad can be achieved, for example, by altering any of a number of factors, including but not limited to: the molecular weight of the polymer, the choice of or concentration of plasticizer of other additives, a coating on the polymer, surface imperfections, or the design of the degradable wad, in particular its thickness.

Across the board, there are two important functional requirements with respect to the durability and degradation of the shotgun wad. The first functional requirement is that the wad must be sufficiently durable to withstand being discharged from a shotgun. Neither the sportsmen nor the state regulators desire "solutions" to the problem of aquatic debris that are costly in terms of money or lost opportunity; therefore, any commercially viable degradable wad must be at least as functional as non-degradable wads. The second functional requirement is that after the wad is spent, the wad should degrade quickly in the aquatic environment. Faster degradation of the shotgun wads means less time that it constitutes a form of aquatic debris.

This is a difficult balancing act, as one would like a degradable wad that (i) has sufficient durability to function as a shotgun wad, yet (ii) quickly degrades into benign components once the shotgun wad continuously soaks in an aquatic environment, such that the wad does not accumulate as aquatic debris. It is difficult to ensure sufficient robustness during discharge but sufficient degradability once the wad is spent.

Through extensive testing, polyhydroxyalkanoate (PHA) was identified as a sufficiently durable material that can be discharged from a shotgun and degraded in an aquatic environment into benign monomers and oligomers. Additionally, PHA wads have certain desirable properties. This polymer degrades substantially faster than many other degradable plastics, and has the unexpected advantage of degrading substantially faster when continuously soaked in an aquatic environment than when soaked most of the time but periodically removed from the water. PHA wads are as functional to contain and propel shot as non-degradable plastic wads and commercially available wads. Additionally, when firing the wads, the PHA wads may undergo a structural change, facilitating fragmentation upon exiting the barrel. Upon exiting the barrel, the PHA wads fragment almost immediately. Further, the shot pattern when shooting the PHA wads is fairly independent of petals (fin-like structures that are built into some designs of wads), and are therefore more responsive to adjustment with the choke, thereby creating a more universal wad for sportsmen.

Figure 1:
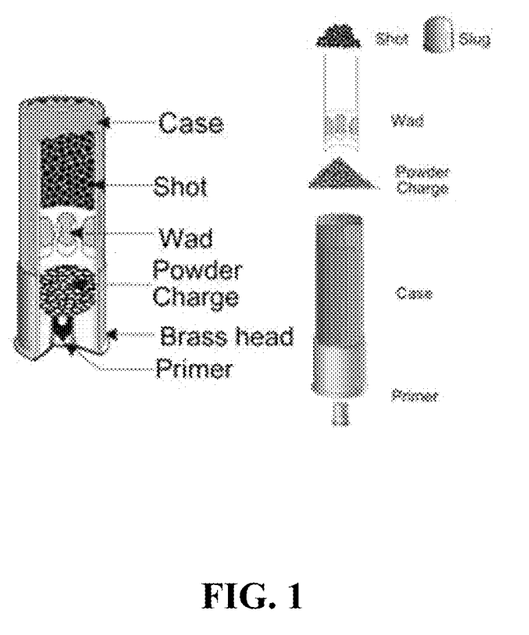
FIG. 1 shows a perspective view of a shotgun shell.

The design of a shotgun shell is shown in representative FIG. 1. The shotgun shell has a plastic case. One end of the shotgun shell contains a brass head and primer. Upon pulling the trigger, the primer ignites the powder charge contained within the shotgun shell. The powder charge propels the wad through the end of the case and out the barrel of the shotgun. The wad can include a slotted cup that holds the shot. The wad directs the shot forward in the direction the shotgun is fired. Upon loss of momentum, both the shot and the wad come to rest at a distance away from the sportsman. After firing the shotgun, the case remains in the shotgun and is manually discharged by the sportsman. Some state regulations require that all sportsmen retain their spent shells and properly dispose of them, in an effort to prevent littering.

Figure 2:
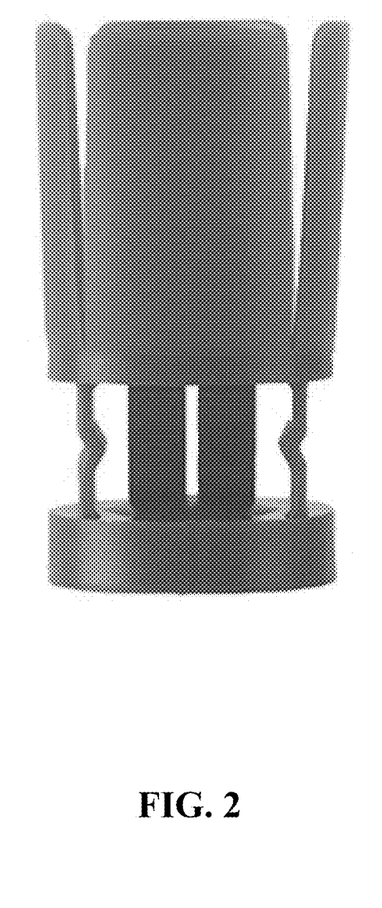
FIG. 2 shows a perspective view of a degradable shotgun wad.

FIG. 2 shows a representative embodiment of a shotgun wad. The degradable shotgun wad serves the same function as a non-degradable shotgun wad, as described with respect to FIG. 1. The mold used to create the shotgun wad in FIG. 2 is compatible with various materials including, but not limited to, non-degradable plastics and PHA. The PHA polymer is sufficiently durable and capable of being molded into any design proscribed by ammunition manufacturers. Therefore, industry conventions regarding wad shape could be maintained. Utilizing PHA rather than non-biodegradable plastics would be no more burdensome to manufacturers since the material is easily molded and manipulated.

Many non-degradable shotgun wads comprise synthetic polymers, typically polyethylene (PE). This plastic is derived from nonrenewable petroleum-based resources. In contrast, PHA is a true biopolymer and breaks down into benign monomers and oligomers. PHA is produced naturally by over three hundred microorganisms via the fermentation of sugar and lipids. In nature, PHA is stored in a cell as an insoluble granule which can be metabolized for future growth. Many common microorganisms utilize PHA as a growth substrate in a variety of environments. PHA is therefore a true biopolymer, both capable of being produced and degraded by a plurality of microorganisms.

Some manufacturers claim that their shotgun wads are degradable. However, these wads often consist of non-degradable plastic in a matrix of degradable materials. The degradable materials break down leaving behind small fragments of non-degradable plastic. Non-degradable plastics can break apart over time into smaller and smaller pieces. These microplastics pose substantial risk to the entire aquatic food web. Microplastic fragments range in size from a few to five hundred micrometers. Due to their abundance, microplastics have become a significant marine debris concern worldwide. Once microplastics enter the aquatic ecosystem, their buoyance, size, and longevity within the water column lead to ongoing problems. Microplastics can be ingested by both pelagic and benthic organisms. Studies have shown microplastic uptake by marine species including filter-feeders, detritivores, deposit feeders, and planktivores. Microplastics accumulate in the fatty tissue of aquatic species. The fatty tissues become more concentrated with microplastics as organisms mature, posing a significant risk for higher order species. For instance, studies have shown the tropic transfer of microplastics from mussels to the crabs that feed on them (Farrell, P. and K. Nelson. 2013. Trophic level transfer of microplastic: *Mytilus edulis* (L.) to *Carcinus maenas* (L.). Environmental Pollution 177: 1-3).

An increasing concern is that microplastics can sorb and concentrate contaminants and pollutants. Therefore, not only are microplastics accumulating in the tissues of organisms, but pollutants are also accumulating. These pollutants are transported throughout the food web to organisms at various trophic levels. Therefore, non-degradable shotgun wads ultimately contribute to the destruction of the aquatic ecosystem.

Unlike non-degradable plastics, polyhydroxyalkanoate (PHA) degrades in aquatic environments (and can also degrade on land) into benign components. Additionally, through extensive field testing, PHA was discovered to have certain beneficial properties related to degradation. PHA has the advantage of degrading at a substantially faster rate than some other degradable plastics. Further, PHA degrades by weight at least twice as fast when the PHA is continuously submerged than when it is periodically removed from the water.

Figure 3:
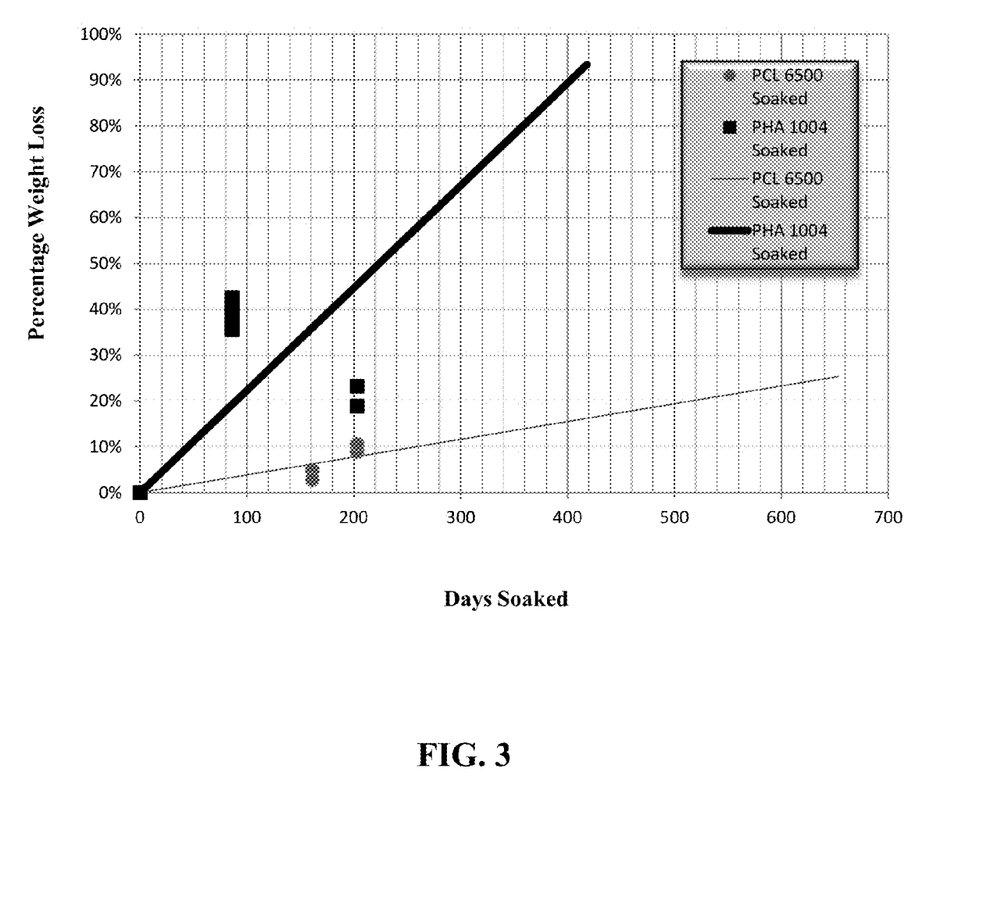
FIG. 3 shows a line graph plotting, as a function of time, the percentage loss of weight of polyhydroxyalkanoate (PHA) degradable cull panels that were continuously soaked compared to polycaprolactone (PCL) degradable cull panels that were continuously soaked. Individual data points from field trials, as well as the lines of best fit for the continuously soaked degradable cull panels, are shown.

In a long term study of degradable cull panels, panels were deployed in crab traps that were submerged continuously, as discussed further in Example 1. In the examples that follow, degradation is determined by monitoring the weight of (dried) degradable components. The long term study of degradable cull panels tested a high molecular weight polycaprolactone, PCL CAPA® 6500, supplied by Perstorp UK Ltd., Cheshire, United Kingdom and polyhydroxyalkanoate polymer, Mirel™P1004. PCL is considered to be a conventional biodegradable polymeric material. FIG. 3 compares PHA degradable cull panels that were continuously soaked to PCL degradable cull panels that were continuously soaked. As shown in FIG. 3, the PHA component degrades at a substantially faster rate than comparable degradable plastics. This is an unexpected and important result. It is not easy to balance the need for sufficient durability with the need for rapid degradation once the wad is spent. But, PHA components had the unexpected advantage of degrading at a faster rate when continuously submerged than similar degradable plastics.

Figure 4:
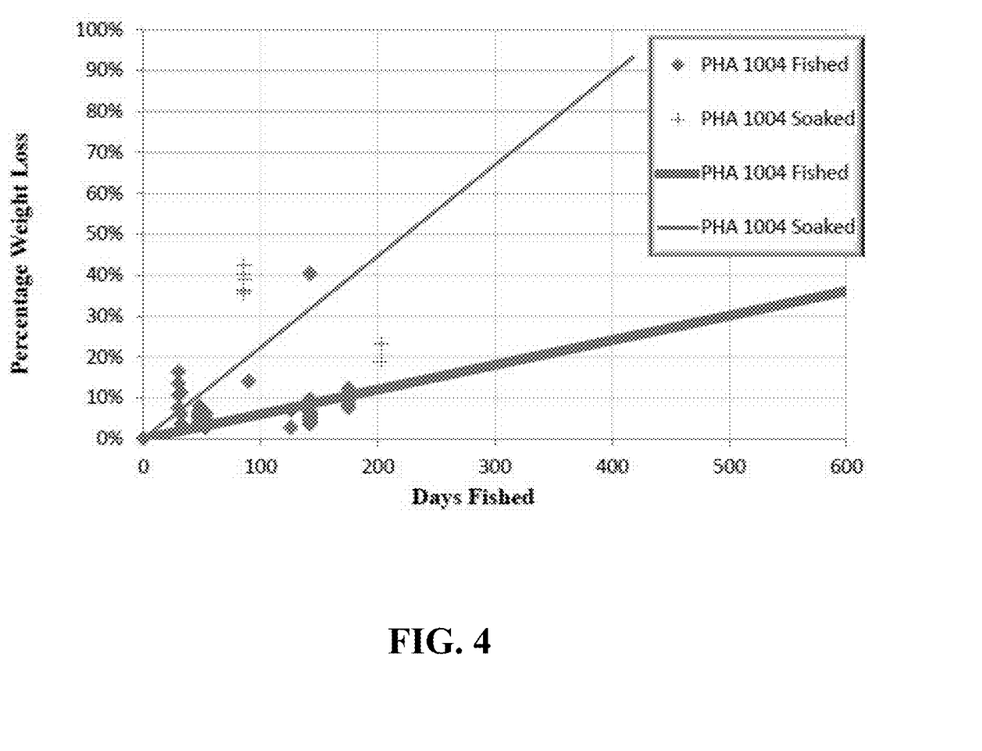
FIG. 4 shows a line graph plotting, as a function of time, the percentage loss of weight of polyhydroxyalkanoate (PHA) degradable cull panels that were either fished or continuously soaked. Individual data points from field trials, as well as the lines of best fit for the fished and continuously soaked degradable cull panels, are shown.

Additionally, non-degradable polymers such as polyethylene float, causing the plastic wad to remain suspended in the water column and travel long distances. In contrast, PHA has a specific gravity around 1.3 causing its tendency to sink. In some embodiments, PHA has a specific gravity greater than the ambient aquatic environment. The a specific gravity in g/cm3 can be greater than water, greater than one, greater than saltwater, greater than 1.025, greater than 1.1, greater than 1.2, greater than 1.3, greater than 1.4, between 1 and 1.45, or between 1.2 and 1.45. PHA is negatively buoyant and will sink in the ambient aquatic environment. Negative buoyancy reduces the potential distance that PHA wads can travel. Further, the negative buoyancy allows the degradable wad to be continuously submerged, which increases the rate of degradation. FIG. 4 compares PHA degradable cull panels that were actively fished (e.g., repeatedly removed from the water) to PHA panels that were continuously soaked. As shown in FIG. 4, the component degrades by weight at least twice as much when the component is continuously submerged than when the component actively fished. The specific gravity of PHA allows the degradable wad to continuously soak as opposed to bobbing at the water's surface where UV radiation can kill off the microorganisms that biodegrade PHA. The data presented in FIG. 4 suggest that the continual submersion of PHA causes faster degradation.

Through further testing, it was discovered that degradable wads comprising PHA are sufficiently durable and inert to withstand being discharged from a shotgun. For example, in some embodiments, PHA formulations having tensile strength of at least 23 mPa when subjected to ASTM method D638, and a tensile elongation at break of at least 6% when subjected to ASTM method D638, achieve the desired durability of the degradable wads.

Figure 5:
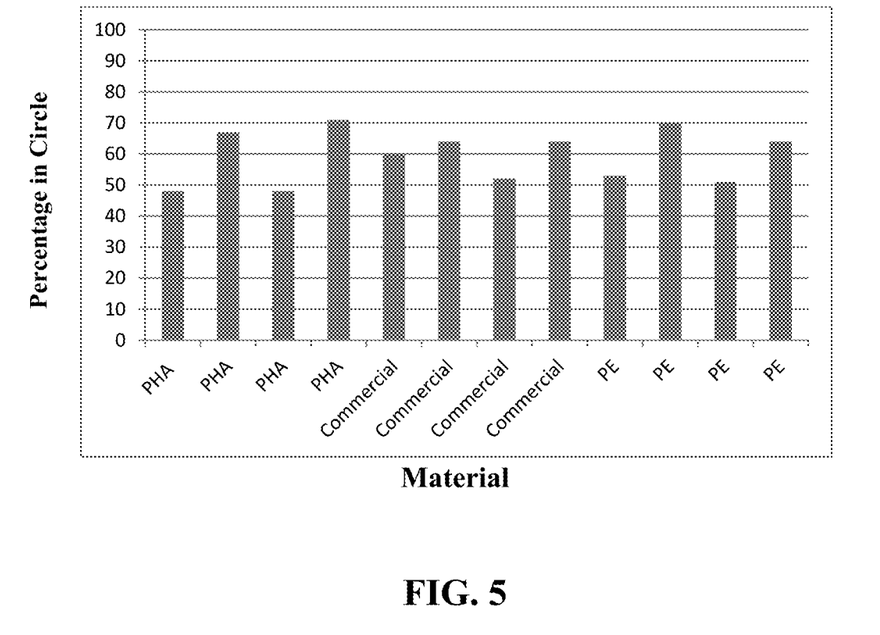
FIG. 5 shows a bar graph plotting the percentage of shot within a 30" circle of a target for molded polyhydroxyalkanoate (PHA) wads, molded polyethylene (PE) wads, and commercially available wads.

In a study of degradable shotgun wads, wads were fired at various targets, as discussed further in Example 2. In the examples that follow, the shot pattern was determined by measuring the amount of shot that was inside the target, typically a 30" circle. In Example 2, the study of degradable shotgun wads utilized commercially available shotgun wads, in addition to wads molded from polyethylene (PE) and polyhydroxyalkanoate (PHA). FIG. 5 compares the shot pattern of the tested shotgun wads. As shown in FIG. 5, the PHA wads perform as well as the PE wads and the commercially available wads. The average of shot within the circle was nearly 60% for all wads. This is an unexpected and important result as it confirms that PHA does not negatively impact the shot pattern.

Unexpectedly, the degradable wads immediately fragmented upon exiting the barrel. From the samples, one explanation is that upon exiting the barrel, air resistance presumably led to rapid fragmentation of the degradable wad. The scattered fragments of the degradable wads landed a short distance from the shotgun. Whereas the other wads remained largely intact, the PHA wads broke apart into small pieces immediately upon exiting the barrel. In some embodiments, the PHA wads resists distorting or warping within the barrel (e.g., maintains 90% of preformed shape, maintains 95% of preformed shaped, maintains 100% of preformed shape, maintains greater than 90% of original shape, maintains greater than 95% of original shape, maintains approximately 100% of original shape). In some embodiments, the PHA wads remained intact while within the barrel (e.g., loss of less than 10% by weight, loss of less than 5% by weight, loss of approximately 0% by weight).

The intact wads were able to travel a farther distance than the degradable wad fragments. When a target was set up 30 yards from the shotgun, the polyethylene shotgun wads and the commercially available shotgun wads traveled well beyond the target 30 yards away. The smaller, fragmented pieces of the PHA wads were not able to travel as far as the non-degradable intact wads. In the testing performed for Example 2, fragments of the degradable wads traveled much shorter distances than the intact non-degradable wads, for example, the PHA wad fragments traveled one foot, 5 feet, 10 feet, and 20 feet from the shotgun.

The rapid fragmentation of the PHA wads suggests that the wads undergo a structural change, but remain intact, while within the barrel. It would be problematic if the degradable shotgun wad actually broke completely apart while inside the barrel. For example, if the wad fragmented inside the barrel, the shot could scratch the inside of the barrel or cause other damage to the shotgun. Further, if the wad broke apart within the barrel, then this would negatively impact the shot pattern.

Since the average of shot within the circle was nearly 60% for all wads tested, the shot pattern was not adversely impacted. This suggests that the degradable wads stayed intact until exiting the barrel. From the data and additional tests of firing into ballistics gel, the PHA wads do not break apart while inside the barrel but rather fragment after exiting the barrel. Therefore, the wads were able to protect the inside of the barrel from being scratched by the shot. The wads were able to propel the shot forward, leading to similar performance, as described above.

This is an unexpected result. For example, the rapid fragmentation and smaller wad fragment size may cause the degradable wad to degrade even faster in an aqueous environment or on land. The fragmentation can increase the surface area for microorganisms to degrade the wad. The other wads, such as the molded polyethylene wads and commercially available wads did not show similar fragmentation upon exiting the barrel. The other wads traveled farther from the shotgun barrel and remained intact.

Figure 6:
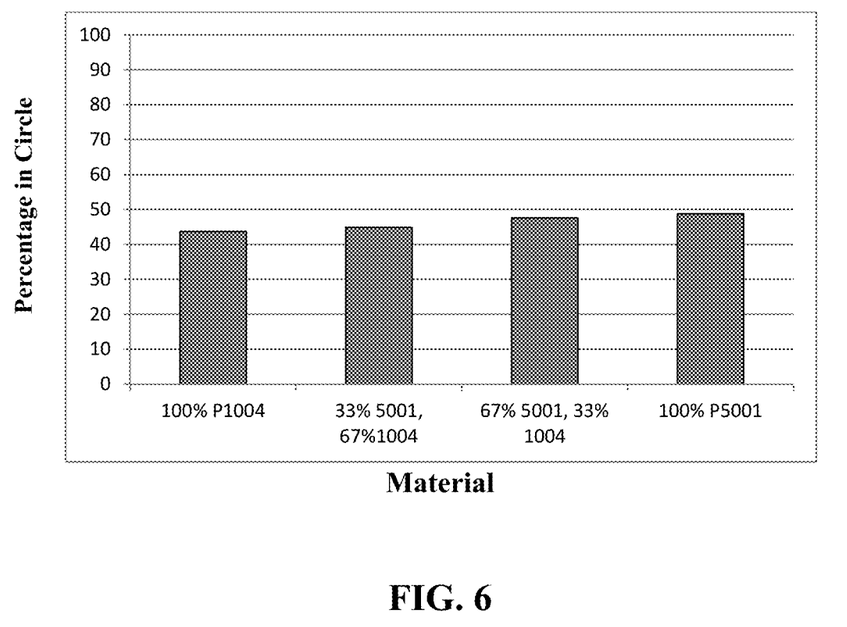
FIG. 6 shows a bar graph plotting the percentage of shot within a 30" circle of a target for various polyhydroxyalkanoate (PHA) blends.

The PHA selected for the degradable wad can impact the shot pattern. In a study of degradable materials, wads were fired at a target, as discussed further in Example 3. In Example 3, degradable wads comprising Mirel™P1004, blends of Mirel™P1004 and Mirel™P5001, and Mirel™P5001 were utilized. FIG. 6 compares the shot pattern of the tested shotgun wads. As shown in FIG. 6, the softer PHA had improved tightness of shot pattern. For softer PHA wads, for example 100% Mirel™P5001, a greater percentage of the shot was within the 30" circle. One explanation is that the more rigid, harder PHA will undergo greater structural change in the barrel leading to a wider shot pattern. Therefore, a softer PHA will undergo less structural change in the barrel leading to a tighter shot pattern.

This is an unexpected result. For example, tailoring the PHA formulation may affect the time to fragmentation of the degradable wad, or may affect the structural change in the PHA wad that occurs upon firing. Based on the results herein, softer PHA formulations such as Mirel™P5001 may undergo less structural change within the barrel, creating a tighter shot pattern.

Figure 7:
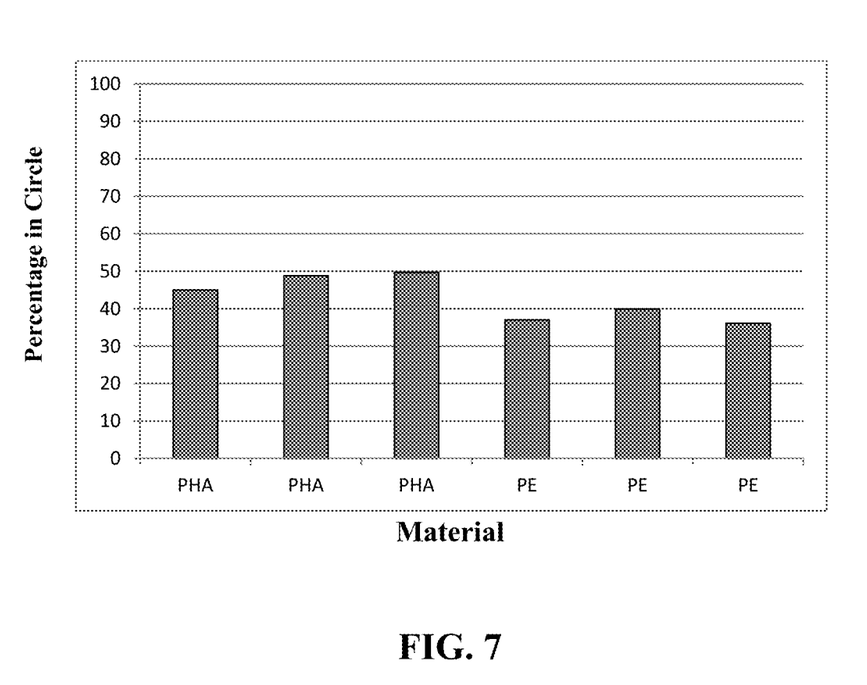
FIG. 7 shows a bar graph plotting the percentage of shot within a 30" circle of a target for polyhydroxyalkanoate (PHA) wads without petals and polyethylene (PE) wads without petals.

The shot accuracy of the degradable wads does not appear to be significantly influenced by petals. In a study of the relationship between petals and shot pattern, wads were fired at a target, as discussed further in Example 4. In Example 4, PHA wads and PE wads were created from the same mold. FIG. 7 compares the shot pattern of the tested shotgun wads. As shown in FIG. 7, the PHA wads had improved tightness of shot pattern compared with the PE wads. For PHA wads without petals, a greater percentage of the shot was within the 30" circle than for PE wads without petals.

This is an unexpected and important result as it confirms that the tightness of the shot pattern does not depend on the petals when using PHA wads. This enables the shot pattern for degradable wads to be more responsive to adjustment with a choke. Chokes are tubes inserted into the barrel of the shotgun which change the angle at which the shot leaves the barrel. This provides the sportsmen with the ability to select tighter shot patterns or wider shot patterns utilizing the same degradable wad, thereby creating a more universal wad for sportsmen.

Therefore, degradable wads comprising PHA have notable advantages. The material is environmentally benign and degrades in aquatic environments when submerged. The material has the unexpected advantage of degrading at a substantially faster rate when continuously submerged than another biodegradable plastics, such as PCL. PHA has a specific gravity around 1.3 causing its tendency to sink, which appears to accelerate the rate of degradation. Further, PHA wads are as functional as commercially available wads and are sufficiently durable to withstand being discharged from a shotgun. The PHA wads undergo a structural change upon firing, allowing them to stay primarily intact within the barrel, but then break apart into small fragments upon exit from the barrel without encountering anything but air. Additionally, the shot pattern of the PHA wads can be adjusted with a choke rather than petals, thereby allowing the same wad to produce different shot patterns.

By utilizing a wad comprising PHA, the function of the wad remains the same, while the environmental footprint of sportsmen substantially decreases. Aquatic creatures would be exposed to less microplastics and toxins, permitting more robust waterfowl species in a purer environment. Sportsmen have a direct stake in the health of waterfowl and are often on the forefront lobbying for more environmentally sound alternatives. Both functional and ecological considerations weigh in favor of PHA as a suitable material for shotgun wads.

The present disclosure has importance beyond waterfowl hunting. PHA wads should be recommended any time a wad is discharged adjacent to or over water. This could occur at skeet shooting ranges, military training operations, or recreation sport shooting off of vessels, in addition to waterfowl hunting. The present disclosure describes cost-effective, easy to manufacture, and user-friendly solution to eliminating shotgun wads as aquatic debris.

EXAMPLES

The examples that follow are intended in no way to limit the scope of this disclosure but instead are provided to illustrate representative embodiments of the present disclosure. Many other embodiments of this disclosure will be apparent to one skilled in the art.

Example 1

In a long term study of degradable cull panels made from PCL and PHA, degradable cull ring panels were deployed in crab traps that were either actively fished or submerged continuously. The PCL grade that was used was CAPA® 6500 (supplied by Perstorp UK Ltd., Cheshire, United Kingdom), a high molecular weight polycaprolactone that showed promise in preliminary studies. The PHA grade that was used was Mirel™P1004, a PHA formulation (including additives and mineral fillers) with high toughness that showed promise in preliminary studies, whereas some other PHA formulations were brittle and had a high failure rate when being actively fished, irrespective of the extent of degradation. Utilizing a set schedule, the degradable cull panels were removed from the water, dried, and weighed at specified times. With the polymers and designs used in this example, failure of a degradable cull panel is unlikely to occur if degradation by weight is less than 20%, but failure is very likely to occur when degradation by weight exceeds 40%.

As is apparent in FIG. 3, PCL panels that were continuously soaked, modeling an abandoned trap, did not reach the 20% degradation threshold until about 520 days. Setting aside any assumptions or line-fitting, none of the four PCL panels that were continuously soaked had greater than 11% degradation even after over 200 days of being submerged continuously in a marine environment. In contrast, PHA panels that were continuously soaked reach the 20% degradation threshold on average at about 90 days, and reach the 40% degradation threshold on average in about 180 days. Of the eight PHA degradable cull panels that were continuously soaked, six of them reached at least 35% degradation within 86 days. The other two reached at least 18.5% degradation within 203 days. In other words, most of the samples failed or were on the verge of failure within 3 months. For additional rate information, after 90 dates, PHA degraded about 20% by weight (e.g., between 15%-25%, greater than 15%, greater than 10%) and the PCL degraded less than 5% by weight (e.g., between 0% and 10%, less than 10%). After 90 days, PHA degraded more than four times as fast as PCL (e.g., at least two times faster, at least three times faster, at least four times faster). After 180 days, the PHA degraded approximately 40% by weight (e.g., between 30% and 50%, between 35% and 45%, greater than 35%, greater than 30%) and the PCL degraded under 10% by weight (e.g., between 5% and 15%, less than 15%). After 180 days, PHA degraded more than four times as fast as PCL (e.g., at least two times faster, at least three times faster, at least four times faster). Extrapolating the best fit line, one would expect PHA panels of this design to degrade completely after about 460 days, wherein after the same period of time, PCL would degrade less than 20% by weight. In some embodiments, PHA completely degrades within 2 years, within 730 days, within 1.5 years, within 550 days, within 1.25 years, within 460 days, within one year, within 365 days. PHA, and components made from PHA such as a degradable wad, would degrade by weight faster when continuously submerged in an aquatic environment than at least one other degradable polymer, such as PCL.

As shown in FIG. 3, the PHA component degrades at a substantially faster rate when continuously soaked than comparable degradable plastics. This is an unexpected and important result. It is not easy to balance the need for sufficient durability with the need for rapid degradation once the wad is spent. But, PHA components had the unexpected advantage of degrading at a faster rate when continuously submerged than similar degradable plastics.

As shown in FIG. 4, 100 PHA panels were actively fished, with weight sampling performed between 30 and 175 days. During the time that a degradable cull panel is actively fished, the panel is mostly submerged in a marine environment and regularly brought to the surface to harvest the crustaceans. Only one (out of 100) had reached the 20% degradation threshold at the time of its testing. As shown in FIG. 4, the panels degrade by weight at least twice as much when the panel is continuously submerged than when the component actively fished. The data presented in FIG. 4 suggest that the continual submersion of PHA causes faster degradation.

This is an unexpected and important result. PHA panels degraded faster when continuously submerged than other degradable plastics, which is ideal for the intended use of the wads. This makes suitable, sufficiently tough PHA superior for use in wads relative to other plastics, such as PCL, that degrade in a marine environment. Without the rigorous field-testing under actual use conditions, this important property of PHA would have gone unnoticed.

Example 2

In a study of degradable shotgun wads, various shotgun wads were fired at a target to compare shot patterns. In this experiment, four polyethylene (PE) shotgun wads, four commercially available shotgun wads, and four polyhydroxyalkanoate (PHA) wads were fired from a shotgun mounted on a bench.

Both the PE and the PHA wads were molded by the experimenters using the same production mold.

The target was placed at 30 yards and 40 yards away from the shotgun. There was not a significant change in shot pattern based on distance to the target. The shotgun was mounted to a bench to provide consistency with the shot. Utilizing a random schedule, the wads were fired and the shot pattern was reviewed. The total shot on the target was counted. The percentage shown in FIG. 5 is the comparison between the total amount of shot within the 30" diameter circle and the number outside the circle but still on the target.

As is apparent in FIG. 5, the PHA wads performs as well as the PE wads and the commercially available wads. Disregarding slight variations between shots, the average of shot within the circle was nearly 60% for all wads tested. Similar results were achieved when the shotgun was fired by an individual rather than attached to a bench.

This is an unexpected and important result as it confirms that PHA does not negatively impact the shot pattern. Therefore, substituting PHA for other materials such as non-degradable plastics does not impact the accuracy for sportsmen and does not compromise the discharge performance. Unlike other degradable wads, such as cardboard, the PHA wads perform just as well as PE wads and commercially available wads.

In addition to measuring the shot on the target, the distance the wad traveled was also measured. The PHA wads fragmented shortly after exiting the shotgun barrel, and the fragments typically traveled less than 20 feet from the shotgun. The other wads, such as the polyethylene shotgun wads and the commercially available wads, traveled farther than the target and remained intact. In Example 2, the polyethylene shotgun shells and the commercially available shotgun shells traveled well beyond the thirty or forty yards to the target.

The discharged PHA wads were also fragmented. Based on the accuracy of the shot pattern described above, it is unlikely that the PHA wads broke apart while inside the barrel of the shotgun. One of ordinary skill would expect a wider pattern and a lower percentage of shot within the 30" circle if the wads broke apart inside the barrel. Therefore, the PHA wad remained completely or primarily intact until exiting the barrel. The PHA wads protected the inside of the barrel from being scratched by the shot, since the wads remained intact. The wads were able to propel the shot forward, leading to a shot pattern similar to non-degradable wads, as described above.

However, the PHA wads immediately fragmented upon exiting the barrel and fell near the shotgun, suggesting that the wads underwent a structural change while within the barrel, somewhat analogous to tempered glass that cracks. The smaller pieces of the PHA wads were not able to travel as far as the non-degradable intact wads. From the samples collected, one explanation is that upon exiting the barrel, air resistance contributed to rapid fragmentation of the degradable wad. This would explain why the scattered fragments of the PHA wads were a shorter distance from the shotgun than other wads.

This fragmentation of the shotgun wad is an unexpected result. PHA panels remain intact while in a shotgun barrel but fragment almost immediately upon exiting the barrel, which is ideal for the intended use of the wads. This makes PHA superior for use in wads relative to other plastics, since the degradable wads rapidly fragment, thereby increasing the surface area for degradation. Without the rigorous field-testing under actual use conditions, this unexpected property of PHA wads would have gone unnoticed.

Example 3

Various formulations of PHA were utilized to form shotgun wads. The wads were fired at a target to compare shot patterns. In this experiment, three degradable wads comprising Mirel™P1004 and three degradable wads comprising Mirel™P5001 were produced. Six addition wads were formed from blends of these two materials. Three wads comprising 67% by weight of Mirel™P1004 and 33% by weight of Mirel™P5001 were created. Three wads comprising 33% by weight of Mirel™P1004 and 67% by weight of Mirel™P5001 were also produced.

Utilizing a random schedule, the wads were fired and the shot pattern was analyzed. The total shot on the target was counted. The percentage shown in FIG. 6 is the comparison between the total amount of shot within the 30" diameter circle and the total shot fired. In the examples herein 338 pellets of shot were accounted for with each firing.

As is apparent in FIG. 6, the softer PHA had improved tightness of shot pattern. For softer PHA wads, for example 100% Mirel™P5001, a greater percentage of the shot was within the 30" circle. One explanation is that the more rigid, harder PHA wads will undergo greater structural change within the barrel, causing a wider shot pattern. Therefore, a softer PHA wads will undergo less structural change within the barrel leading to a tighter shot pattern. Disregarding slight variations between shots, the average of shot within the circle increased with the use of softer, more malleable PHA.

This is an unexpected and important result. For example, tailoring the PHA formulation may cause the degradable wad to perform better. Based on the results herein, softer PHA formulations such as Mirel™P5001 may yield a tighter shot pattern.

Example 4

In a study of wad design, two sets of shotgun wads were fired at a target to compare shot patterns. In this experiment, three polyethylene (PE) shotgun wads and three polyhydroxyalkanoate (PHA) wads were fired from a shotgun.

Both the PE and the PHA wads were molded by experimenters. The PHA grade that was used was Mirel™P5001, a PHA formulation (including additives and mineral fillers) that showed promise with other experiments. The mold was the same for each wad. The mold created a wad with petals, but the petals were mechanically removed.

Utilizing a random schedule, the wads were fired and the shot pattern was reviewed. The total shot on the target was counted. The percentage shown in FIG. 7 is the comparison between the total amount of shot within the 30" diameter circle and the total shot fired. In the examples herein 338 pellets of shot were accounted for with each firing.

As is apparent in FIG. 7, the PHA wads without petals performed better than the analogous PE wads without petals. Disregarding slight variations between shots, the average of shot within the circle was nearly 48% for PHA wads compared with 38% for PE wads. The PHA wads without petals had improved tightness of shot pattern compared with the PE wads without petals.

This is an unexpected result as it shows the shot accuracy with PHA wads does not appear to be significantly influenced by the petals. Manufactures provide petals in order to provide spin stability of the wad as it travels through the barrel. The petals contribute to a tighter pattern of the shot. With regards to PE, removing the petals creates a wider shot pattern and less shot hit within the targeted area. Rather than relying on the structure of the wad such as petals, the shot pattern for degradable wads can be altered using devices such as a choke, and is more responsive to adjustment with a choke. Chokes are tubes inserted into the barrel of the shotgun which change the angle at which the shot leaves the barrel. This provides the sportsmen with the ability to produce tighter shot patterns or wider shot patterns utilizing the same wad, thereby creating a more universal wad for sportsmen.

EQUIVALENTS

While specific embodiments of the subject invention have been discussed, the above specification is illustrative and not restrictive. Many variations of the invention will become apparent to those skilled in the art upon review of this specification. The full scope of the invention should be determined by reference to the claims, along with their full scope of equivalents, and the specification, along with such variations.

The articles "a" and "an" are used herein to refer to one or to more than one (i.e. to at least one) of the grammatical object of the article. By way of example, "a wad" means one wad or more than one wad.

Any ranges cited herein are inclusive.

What is claimed is:
1. A degradable wad comprising:
a wad,
wherein said wad is configured to degrade in an aquatic environment,
wherein said wad is suitable for use as a shotgun wad,
wherein said wad is sized to fit within a shotgun shell, and
wherein any biodegradable composite of the wad consists essentially of a polyhydroxyalkanoate polymer with a specific gravity greater than one.
2. The degradable wad of claim 1, wherein the wad degrades into benign monomers and oligomers.
3. The degradable wad of claim 1, wherein the polyhydroxyalkanoate polymer comprises hydroxybutyrate monomer.
4. The degradable wad of claim 1, wherein the polyhydroxyalkanoate polymer has a molecular weight in the range at $2 \times 10^5$ to $3 \times 10^6$ daltons.

5. The degradable wad of claim 1, wherein the wad degrades into benign monomers and oligomers in an ambient aquatic environment.

6. The degradable wad of claim 1, wherein the wad degrades four times as fast as a polycaprolactone wad of the same design when continuously submerged in the same ambient aquatic environment.

7. The degradable wad of claim 1, wherein percentage of loss of mass of the polyhydroxyalkanoate polymer is approximately 20% after 90 days and approximately 40% after 180 days when exposed to ambient conditions.

8. The degradable wad of claim 1, wherein the specific gravity is in the range of 1.2 to 1.45.

9. The degradable wad of claim 1, wherein the specific gravity will accelerate the degradation of the material.

10. The degradable wad of claim 1, wherein the wad is configured to stay intact until exiting a barrel of a shotgun.

11. The degradable wad of claim 1, wherein the wad is configured to rapidly fragment upon exiting the barrel.

12. The degradable wad of claim 1, wherein the wad lacks petals.

13. A degradable wad comprising: a wad, wherein said wad is suitable for use in a shotgun shell, wherein said wad consists essentially of a polyhydroxyalkanoate polymer, wherein the wad comprises additives, and wherein said wad has a specific gravity greater than one.

14. The degradable wad of claim 13, wherein the wad degrades into benign monomers and oligomers.

15. The degradable wad of claim 13, wherein the polyhydroxyalkanoate polymer comprises hydroxybutyrate monomer.

16. The degradable wad of claim 13, wherein the polyhydroxyalkanoate polymer has a molecular weight in the range at $2 \times 10^5$ to $3 \times 10^6$ daltons.

17. The degradable wad of claim 13, wherein the wad degrades into benign monomers and oligomers in an ambient aquatic environment.

18. The degradable wad of claim 13, wherein the wad degrades four times as fast as a polycaprolactone wad of the same design when continuously submerged in the same ambient aquatic environment.

19. The degradable wad of claim 13, wherein percentage of loss of mass of the polyhydroxyalkanoate polymer is approximately 20% after 90 days and approximately 40% after 180 days when exposed to ambient conditions.

20. The degradable wad of claim 13, wherein the specific gravity is in the range of 1.2 to 1.45.

\* \* \* \* \*

UNITED STATES PATENT AND TRADEMARK OFFICE
CERTIFICATE OF CORRECTION

PATENT NO.       : 9,528,800 B2                          Page 1 of 1
APPLICATION NO.  : 14/303496
DATED            : December 27, 2016
INVENTOR(S)      : Kirk J. Havens et al.

It is certified that error appears in the above-identified patent and that said Letters Patent is hereby corrected as shown below:

In the Specification

In Column 6 at Line 14 (approx.), Change "decomponsition" to --decomposition--.

In Column 8 at Lines 45-46, Change "-hydroxybutrate." to -- -hydroxybutyrate.--.

In Column 10 at Line 6, Change "The a" to --The--.

In the Claims

In Column 18 at Line 10, In Claim 16, change "2×105 to 3×106" to --$2 \times 10^5$ to $3 \times 10^6$--.

Signed and Sealed this
Eighteenth Day of April, 2017

Michelle K. Lee
*Director of the United States Patent and Trademark Office*